Dec. 6, 1949 V. J. PRICE 2,490,540
ANIMAL TRAP
Filed March 23, 1944
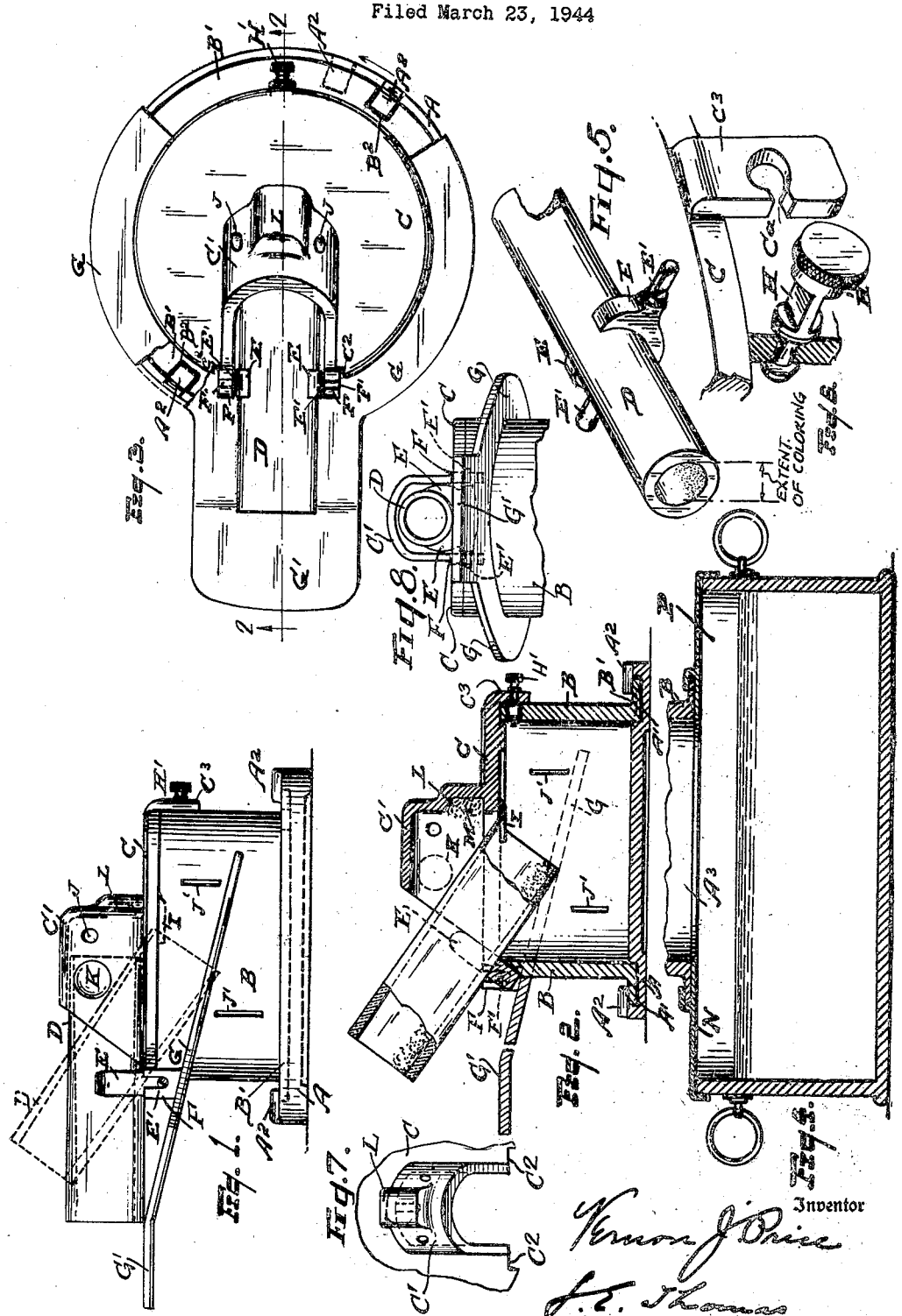

Patented Dec. 6, 1949

2,490,540

UNITED STATES PATENT OFFICE 2,490,540

ANIMAL TRAP

Vernon J. Price, West Dearborn, Mich.

Application March 23, 1944, Serial No. 527,732

3 Claims. (Cl. 43—69)

My invention relates to an improvement in animal traps—and especially to mouse traps—shown in the accompanying drawings and more particularly described and pointed out in the following specifications and claims.

In the drawings:

Figure 1 is a side elevation of the trap, showing a tilting tube adapted to be automatically "set" in a horizontal plane to permit a rodent to enter the trap, enticed through the odor or lure of bait lodged within the body of the trap; showing also in dotted lines, the tube tilted at an acute angle by the weight of a rodent entering the tube, and whereby it is discharged into the trap body. The tube being weighted at its outer end is then automatically returned to its former horizontal position, thus cutting off the escape of the captured rodent and instantly resetting the trap for another catch.

Figure 2 is a vertical section, taken substantially on the line 2—2 of Figure 3, showing the tube in tilted position.

Figure 3 is a plan view of the trap, showing a runway-track (with a portion broken away) on each side of the trap body, leading to a platform directly in front of the open end of the tilting tube, from which position the "bait" may be seen by the rodent.

Figure 4 is a vertical cross-sectional view of a modification, showing the base of the trap with an opening therethrough and mounted upon a pan or other receptacle adapted to be filled with water, whereby upon the rodent being discharged through the tilting of the tube into the trap it may be drowned in the water receptacle supporting the trap body.

Figure 5 is a perspective view of the tilting tube and its supporting trunnion element, whereby it is journalled in suitable bearings located adjacent the wall of the trap body.

Figure 6 is a perspective view of a detail, showing means, in separated condition, for securing the cover plate to the trap body.

Figure 7 is a fragmentary top plan view of the cover plate removed, showing particularly the notches therein for the reception of the bearings formed on the body portion; and Figure 8 is a fragmentary front elevation of the device as shown in Figure 1.

Referring now to the letters of reference indicating the several parts shown in the drawings:

A denotes the base of the trap, on which is mounted an annular chamber B, having a projecting flange B', at its lower edge, which is centered in an annular groove or recess A', in the base A—the flange B' being flush with the top of the base.

Projecting upwardly from the rim of the base and overlapping the flange B' are a plurality of lugs $A^2$, which are designed to pass through slots $B^2$, in the flange, and upon a slight relative rotation of the base A, in respect to the annular body B—the lugs are adapted to overlap the flange—see arrow, Figure 3—thereby locking the base and annular body together.

C denotes a cover plate, from which rises a hooded top or upstanding dome C', adapted to receive one end of a tilting tube D, supported in a rocking frame, or member E, having oppositely extending trunnions E', journaled in bearings F, F, adjacent to the wall of the annular chamber B.

One or both of the trunnions E', may be longitudinally divided near its end (see Figure 5) that it may enter a relatively narrow vertical slot F'', leading to the bearing F; whereby it is held in the bearing against accidental dislodgment—as will be readily understood.

The bearings F, F, adjacent to the wall of the chamber B, rise from an inclined runway-track G, partially encircling the annular chamber B, and carrying a tongue having an outer free end portion bent to form a horizontal platform $G^1$. The outer end of the tube D rests upon the tongue at approximately the inner end of the platform when the trap is "set" to admit rodents into the chamber B.

The cover-plate C is notched at $C^2$ (see Figures 3 and 7) to receive the bearing members F, F, and which serve to "center" the cover-plate on the top of the annular chamber B; the cover-plate is further secured by a depending lug $C^3$ (see Figure 6) slotted at $C^a$, to receive the flattened shank H of a manually operated bolt H' rotatably carried by the wall of the chamber B, whereby upon entering the slotted lug $C^3$, the bolt may be rotated to securely lock the cover-plate C, upon the top of the annular chamber B. The recesses or notches $C^2$ are of sufficient size to permit the turning movement of the cover-plate with the lug $C^3$ with respect to the chamber B and the bolt $H^1$, for engaging the lug with the bolt.

Extending from the underside of the cover-plate C, into the path of the tilting tube D, is an arm I, to limit the tilting movement of the tube, whereby upon discharging the rodent into the body of the trap the tube, heavier at its outer end due to gradual increased thickness of its walls towards its outer end, as shown in Figure 5, instantly returns to its initial horizontal position (see Figure 1) thereby automatically setting the trap for another catch, and also insuring against the escape of the previously captured rodent.

Several perforations J, and slots J', are provided in the hooded top and chamber walls of the trap for ventilation, and through which the scent of the bait may pass, to serve as a lure to attract rodents to enter the trap.

It will be noted that the device consists of four elements which are relatively connected; and that it may be easily and readily lifted in its entirety—depressions KK are also provided in the outer faces of the hooded top C' (see Figures 1 and 2), whereby the trap may be gripped between the fingers and thumb for convenience in handling it as a whole.

To receive and support the bait, a depression L is provided in the end wall of the hooded top C', into which the bait M is packed.

In Figure 4 is shown a modification of the device, in which the base A is omitted and the chamber B is mounted on cover-plate N, having an opening into a water pan or pail P, whereby the captured rodent is precipitated directly into the water and drowned. Rings are provided at opposite sides of the pan so that, by grasping them, the pan may be readily lifted and carried from one place to another.

It has been found in practice that a rodent will more readily enter the open end of the tiltable tube, which is preferably constructed of glass or other transparent material so that rodents may readily see the bait, if the lower portion of the tube is painted or otherwise colored to form an opaque lower portion of the tube. This construction is therefore preferred.

Having thus described my invention, what I claim is:

1. An animal trap comprising a base-plate; a chambered body detachably secured to the base-plate and having an annular wall; an open-end tiltable tube heavier at one end than at its other end, upstanding bearings adjacent the upper end of the annular wall of the chambered body, said tube being tiltably mounted between said bearings and extending across the wall of the body with its heavy end portion projecting outwardly from the body and its lighter end portion extending partially across the upper end of the body, a detachable cover plate for the chambered body having its periphery notched to receive the upstanding bearings carried by the wall of the chambered body; said cover plate being formed with an opening through which the tube moves when the inner end of the tube is tilted downwardly by weight of an animal passing through the tube towards the inner end thereof, a slotted lug extending downwardly from the periphery of the cover plate; and a rotatable bolt projecting from the wall of the chambered body, adapted to enter and engage the slotted lug, whereby the cover plate is detachably secured to the chambered body.

2. An animal trap comprising a base plate; a chambered body detachably secured to the base-plate; a detachable cover for the chambered body formed with an opening, a tiltable tube having one end portion heavier than its other end portion, said tube being pivoted to said body with its heavy end portion projecting laterally from the body and its lighter end portion extending inwardly in position for passing through the opening in the cover and into the chambered body when the inner end portion of the tube is tilted downwardly, the upper portion of the tube being transparent throughout its length, the lower portion of the tube being substantially opaque, whereby a rodent may walk with confidence into the tube, until the weight of the rodent tilts the inner portion of the tube through the opening in the cover, thereby precipitating the rodent into the body of the trap, whereupon the heavy outer end of the tube instantly returns the tube to its initial position, thereby automatically setting the trap for another catch.

3. A device of the character described comprising a base, a hollow body supported upon said base and defining a chamber open at its top, a detachable cover plate for the chamber formed with a radially extending opening and carrying an upstanding dome extending radially of the top over the opening and open at its outer end, the inner end of the dome being formed internally with a bait-receiving pocket disposed inwardly of the inner end of the opening in the cover plate, upstanding bearings carried by said body at opposite sides of the open outer end of the dome, a tiltable tube having an outer end portion heavier than its inner end portion, said tube being pivotally mounted between said bearings with its inner portion extending into the dome through the open outer end of the dome and downwardly through the opening in the cover plate whereby an animal entering the open outer end of the tube and passing through the tube towards bait at the inner end of the dome will, due to the weight of the animal, cause the tube to tilt and thereby precipitate the animal into the body of the trap, whereupon the heavy outer end portion of the tube will instantly serve to return the tube to its initial position and cut off escape of the animal and automatically effect resetting of the trap, and a tongue carried by the cover plate and extending into the inner end of the tube for limiting downward tilting thereof by engagement with the upper portion of the tube.

VERNON J. PRICE.

REFERENCES CITED

The following references are of record in the file of this patent:

UNITED STATES PATENTS

| Number | Name | Date |
|---|---|---|
| 53,164 | Melone | Mar. 13, 1866 |
| 100,779 | Lyman | Mar. 15, 1870 |
| 141,346 | Hannah | July 29, 1873 |
| 361,208 | Castleman | Apr. 12, 1887 |
| 894,962 | Lund | Aug. 4, 1908 |
| 1,213,876 | Hovis | Jan. 30, 1917 |
| 1,286,601 | Haege | Dec. 3, 1918 |
| 1,398,499 | Burnham | Nov. 29, 1921 |
| 1,635,224 | Rowley | July 12, 1927 |
| 2,088,848 | Fay | Aug. 3, 1937 |
| 2,113,306 | Martinez | Apr. 5, 1938 |

FOREIGN PATENTS

| Number | Country | Date |
|---|---|---|
| 3,701 | Great Britain | of 1889 |
| 303 | Great Britain | Jan. 5, 1900 |